United States Patent

Mestanza et al.

Patent Number: 6,020,437
Date of Patent: Feb. 1, 2000

[54] PROPYLENE POLYMER AND PROCESS FOR OBTAINING IT

[75] Inventors: Raphaël Mestanza, JV Bergen Op Zoom; Didier Graebling, Eckbolsheim; Morand Lambla, Hoenheim, all of France

[73] Assignee: Solvay Polyolefins Europe - Belgium (Sociétété Anonyme), Brussels, Belgium

[21] Appl. No.: 08/679,390

[22] Filed: Jul. 9, 1996

[30] Foreign Application Priority Data

Jul. 11, 1995 [FR] France ................................ 95 08490

[51] Int. Cl.[7] ............................................. C08F 8/00
[52] U.S. Cl. .......................... 525/305; 525/261; 525/352
[58] Field of Search .................................. 525/343, 304, 525/305, 306, 309; 264/176.1

[56] References Cited

U.S. PATENT DOCUMENTS

| | | | |
|---|---|---|---|
| 4,985,502 | 1/1991 | Izumi et al. | 525/194 |
| 5,494,962 | 2/1996 | Gauthy et al. | 525/193 |

FOREIGN PATENT DOCUMENTS

| | | |
|---|---|---|
| 0601635 | 6/1994 | European Pat. Off. . |
| 1250119 | 9/1967 | Germany . |
| 59/093711 | 5/1984 | Japan . |

OTHER PUBLICATIONS

H.J. Yoo et al.: "Rheology of High Melt Strength Polypropylene". In: ANTEC '92/569.

B.K. Kim et al.: "Cross–Linking of Polypropylene by Peroxide and Multifunctional Monomer During Reactive Extrusion". In: Advances in Polymer Technology, vol. 12, No. 3, pp. 263–269 (1993).

*Primary Examiner*—Christopher Henderson
*Attorney, Agent, or Firm*—Venable; John W. Schneller

[57] ABSTRACT

Propylene polymer obtained by melt-blending of:
- 100 parts by weight of polypropylene;
- from 0.01 to 10 parts by weight of a functional compound (a) comprising at least 2 acrylate groups;
- at least 0.005 part by weight of a sulphur-containing compound (b) chosen from thiuram sulphides; and
- from 0.01 to 5 parts by weight of a compound (c) capable of generating free radicals.

13 Claims, 2 Drawing Sheets

PROPYLENE POLYMER AND PROCESS FOR OBTAINING IT

FIELD OF THE INVENTION

The present invention relates to a propylene polymer with modified Theological properties. It also relates to a process for obtaining this polymer and to its use for the manufacture of objects by extrusion, calendering, injection moulding and thermoforming processes and for the manufacture of foams. Finally, it relates to shaped objects containing this polymer.

TECHNOLOGY REVIEW

Propylene polymers, hereinafter known more simply as polypropylene, are known for their mechanical properties and for their transparency and their heat resistance. Their relatively low cost makes them a material of choice for a large number of applications, such as the formation of shaped objects.

However, their rheological properties in the melt are such that they can be difficult to process by some methods such as extrusion, calendering, injection moulding and thermoforming. These polymers are furthermore rather unsuitable for forming foams.

Attempts have already been made to improve the properties of polypropylene by heat-treating a mixture containing polypropylene, an organic peroxide and a crosslinking agent chosen from divinylbenzene, allyl cyanurates and specific acrylates (JP-A-59/093,711).

In this way, a polymer is obtained exhibiting an excellent surface gloss, good heat resistance, a high rate of crystallization, a high strength at the melting point and good rigidity.

However, when the crosslinking agent is an acrylate, the rheological properties of the polymer remain inadequate for some applications, such as thermo-forming and the manufacture of foams.

Furthermore, Patent Application EP-A-601,635 (Solvay) discloses that compositions obtained by melt-blending polypropylene in the presence of polyethylene and of at least one functional compound exhibit a melt strength characterized by a high elongational viscosity at low rate gradient and by an increase in the resistance to deformation during elongation or extension.

However, obtaining these good rheological properties in the melt is related to the presence of the polyethylene, which modifies the physical and mechanical properties of the polypropylene, which is not always desired. In particular, a reduction in the transparency or in the strength at high temperatures is observed.

SUMMARY OF THE INVENTION

A propylene polymer has now been found which exhibits satisfactory rheological properties in the melt and, in particular, an increase in the resistance to deformation during elongation or extension and which does not exhibit the disadvantages of the polymers belonging to the prior art.

BRIEF DESCRIPTION OF THE DRAWINGS

The figures illustrate RER diagrams of the elongational viscosity of propylene polymers determined by means of a rheometer and represent the variation, at 190° C., in the melt elgonation viscosity as a function of time for an elongation gradient of 0.1.

DETAILED DESCRIPTION OF THE INVENTION

Figure 1:
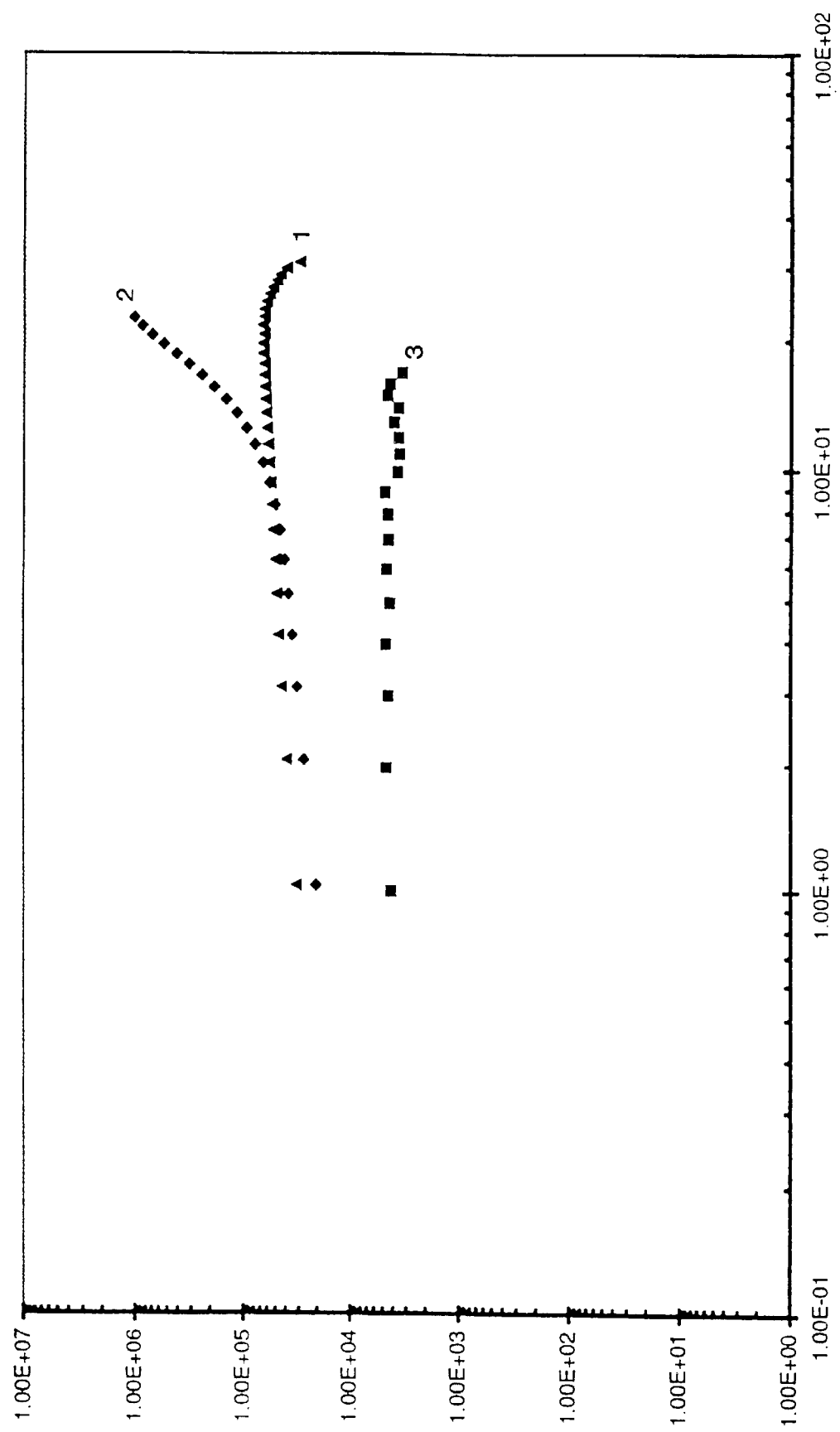

Consequently, the present invention relates to a propylene polymer obtained by melt-blending:

100 parts by weight of polypropylene;
from 0.01 to 10 parts by weight of a functional compound (a) comprising at least 2 acrylate groups;
at least 0.005 part by weight of a sulphur-containing compound (b) chosen from thiuram sulphides, and
from 0.01 to 5 parts by weight of a compound (c) capable of generating free radicals.

The polypropylene which can be used according to the invention is chosen from the homopolymers of propylene and the copolymers of the latter containing at least 50 mol % of propylene and at least one other monomer chosen from α-olefins containing from 2 to 20 carbon atoms, unsaturated organic acids and their derivatives, vinyl esters, aromatic vinyl compounds, vinylsilanes and diolefins. Preferably, the other monomer or monomers are chosen from α-olefins and more particularly from ethylene and 1-butene.

The preferred polypropylenes according to the present invention are propylene copolymers.

Propylene copolymers are intended to mean both the random copolymers of propylene and the block copolymers of the latter.

The former generally consist of macromolecular chains in which the monomers are distributed statistically. The propylene content of these random copolymers is in most cases higher than 70 mol %, preferably higher than or equal to 75 mol %. The latter consist of distinct blocks of variable composition; each block consisting of a homopolymer of propylene or of another α-olefin or of a random copolymer including propylene and at least one other monomer chosen from the above-mentioned monomers.

Copolymers with propylene blocks are generally obtained by polymerization in a number of consecutive stages in which the different blocks are prepared successively.

Copolymers with propylene blocks are particularly well suited and, among the latter, those which contain from 30 to 90% by weight of a first block which is a propylene homopolymer and from 70 to 10% by weight of a second block which is a random propylene copolymer containing from 40 to 60 mol % of ethylene give particularly good results.

It is obvious that propylene polymers obtained by making use of a number of polypropylenes as defined above are not excluded from the present invention.

The functional compounds (a) which can be used for obtaining the propylene polymers according to the present invention generally contain at most 7 acrylate groups. Compounds (a) which contain from 3 to 5 acrylate groups give good results. By way of preferred examples of these compounds, there may be mentioned the following compounds commonly known as trimethylolpropane triacrylate, trimethylolpropane ethoxylate triacrylate, glycerol propoxylate triacrylate, pentaerythritol triacrylate, di(trimethylolpropane) tetraacrylate, pentaerythritol tetraacrylate, pentaerythritol ethoxylate tetraacrylate, trimethylolpropane trimethacrylate and pentaerythritol ethoxylate triacrylate. It is obvious that one or a number of compounds (a) can be made use of.

Everything else being equal, trimethylolpropane triacrylate, trimethylolpropane ethoxylate triacrylate, pentaerythritol triacrylate, di(trimethylolpropane) tetraacrylate and pentaerythritol ethoxylate tetraacrylate give particularly good results.

The amount of functional compound (a) is in most cases at least 0.05 part by weight, preferably at least 0.5 part by weight. Good results are obtained when this amount is lower than or equal to 6 parts by weight and more particularly lower than or equal to 2 parts by weight. Amounts of 0.5 to 2 parts by weight per 100 parts by weight of polypropylene are particularly well suited.

The thiuram sulphides (compounds (b)) which can be used for obtaining the propylene polymers according to the invention correspond to the general formula

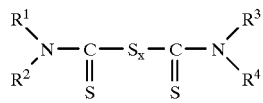

in which x is equal to 1, 2 or 4 and $R^1$, $R^2$, $R^3$ and $R^4$, which can be identical or different, represent an alkyl radical containing from 1 to 10 carbon atoms or a phenyl radical, it being possible for $R^1$ and $R^2$ and $R^3$ and $R^4$ respectively to form together a divalent radical of formula —$(CH_2)_n$— where n is equal to 5 or 6. Thiuram sulphides in which x is equal to 2 are particularly well suited.

By way of preferred examples of compound (b), there may be mentioned tetraethylthiuram disulphide, tetramethylthiuram disulphide, tetraisopropylthiuram disulphide, dicyclopentamethylthiuram disulphide and dimethyldiphenylthiuram disulphide. Tetraethylthiuram disulphide is particularly well suited.

The thiuram sulphide can be used in a very small amount. Highly significant results are already obtained for amounts as low as 0.01 part by weight per 100 parts by weight of polypropylene. Good results are obtained when this amount is at least 0.015 part by weight. The maximum amount of thiuram sulphide is generally not critical. However, it is preferable for it to be lower than or equal to 0.1 part by weight, preferably lower than or equal to 0.05 part by weight. Amounts of 0.015 to 0.05 part by weight per 100 parts by weight of polypropylene give particularly good results.

The compound (c) capable of generating free radicals is in most cases chosen from organic peroxides, persulphates and diazo compounds. As examples of such compounds, there may be mentioned N-bromosuccinimide, dicumyl and benzoyl peroxides, cumene hydroperoxide, 2,5-dimethyl-2,5-di-tert-butylperoxyhexane, potassium or ammonium persulphates, azobisisobutyronitrile, and the like.

The compounds which are best suited are those which decompose at the temperatures at which the melt blending is performed. Peroxides are generally preferred. Among these, 2,5-dimethyl-2,5-di-tert-butylperoxyhexane, tert-butyl cumyl peroxide and dicumyl peroxide give good results.

The amount of compound (c) which is used is in most cases higher than or equal to 0.01 part by weight. It is moreover generally lower than or equal to 1 part by weight, more particularly lower than or equal to 0.1 part by weight. Amounts of 0.01 to 0.1 part by weight per 100 parts by weight of polypropylene give good results.

The propylene polymers according to the present invention are obtained by melt-blending a polypropylene in the presence of the compounds (a), (b) and (c) described above.

In most cases, this melt-blending is carried out under conditions such that there is at least partial reaction of the molecules of the compounds (a) and (b) with each other and/or with the polypropylene.

The conditions under which this blending is carried out are not critical, provided that they induce at least partial melting of the polypropylene. They are preferably such that there is complete melting of the polypropylene.

The blending is generally performed at a temperature not exceeding 400° C., preferably not exceeding 300° C. and more particularly not exceeding 250° C.

The minimum temperature at which the melt-blending is generally performed is higher than or equal to 130° C., preferably higher than or equal to 150° C. and more particularly higher than or equal to 180° C. Very good results are obtained when this temperature is higher than or equal to 180° C. and lower than or equal to 230° C.

The blending time is chosen by taking into account the nature of the compounds used and the temperature at which blending is carried out.

This time generally varies from 5 seconds to 120 minutes, in most cases from 10 seconds to 30 minutes.

Blending is performed in any known device for this purpose. It is thus possible to employ internal or external mixers. Internal mixers are the most appropriate ones and, among these, the non-continuous mixers of Brabender type and the continuous mixers, such as extruders.

Extruders are particularly well suited. The order of introduction of the different components into the mixers is not critical.

They can equally well be introduced in isolation and successively or a premix of the different constituents with each other or of only a part of these constituents may be produced.

The polymers according to the present invention may also contain other conventional additives such as, for example, stabilizers, antioxidants, lubricants, antistatic agents, nucleating agents, foaming agents, glass fibres or any other fillers. As regards the stabilizers and the antioxidants, it is found that it proves to be advantageous to introduce them as soon as possible into the molten mass containing the polypropylene and the compounds (a), (b) and (c).

The propylene polymers according to the present invention exhibit the essential characteristics of polypropylene, namely good mechanical properties, good heat resistance and high transparency. In most cases they also possess particularly advantageous rheological and viscoelastic properties. It is found, in fact, that in the molten state they generally exhibit an increase in the resistance to deformation during elongation or extension. Such a phenomenon is generally called "structural stress-hardening". It can be easily characterized by the determination, at a given temperature and rate of elongation, of the change in the elongational viscosity of the polymer in the molten state as a function of the elongation time. When subjected to such tests, the propylene polymers according to the present invention exhibit an increase in elongational viscosity. Such a behaviour makes them particularly advantageous for obtaining objects shaped by injection moulding and by extrusion and in particular by blow-extrusion or injection blow moulding, thermoforming or coating (see, for example ANTEC 92/569). These different implementational processes can moreover be carried out at high rates. Such a property is also essential for the manufacture of foams. Such uses of the propylene polymers according to the invention, as well as the shaped objects containing the said polymers, consequently constitute additional aspects of the present invention.

It is also observed that the propylene polymers according to the present invention contain few, and advantageously no, agglomerates of higher viscosity capable of impairing the shaped objects containing them.

Finally, the present invention relates to a process for obtaining a propylene polymer including a stage of melt-blending of:
100 parts by weight of a polypropylene;
from 0.01 to 10 parts by weight of a functional compound (a) chosen from compounds comprising at least 2 acrylate groups;

at least 0.005 part by weight of a sulphur-containing compound (b) chosen from thiuram sulphides; and from 0.01 to 5 parts by weight of a compound (c) capable of generating free radicals.

The various characteristics of this process are identical with those described above in connection with the propylene polymers according to the present invention.

The process according to the present invention has the advantage of being particularly simple to implement. It also makes it possible to obtain, reproducibly and in relatively short periods of time, the propylene polymers exhibiting the advantageous properties described above.

EXAMPLES

The following Examples serve to illustrate the invention.

In these Examples, the propylene polymers are obtained with the aid of a corotative twin-screw extruder of Werner & Pfleiderer ZSK 30 type, in which the screws consist successively of feed, mixing and devolatilization zones. The feed zone temperature is 160° C. at the entry and 180° C. at the exit; the mixing zone temperature is 190° C. at the entry and 210° C. at the exit and the devolatilization zone temperature is 210° C.

The rate of rotation of the screws is 150 revolutions/min at a stock throughput of 5 kg/h. The various products are premixed in a drum. The elongational viscosity of the propylene polymers is determined by means of a rheometer marketed by Rheometrics under the name Rheometrics Extensional Rheometer RER 9000. The curves reproduced in the appended FIGS. 1 and 2 (called RER diagrams hereinafter) represent the variation, at 190° C., in the melt elongational viscosity (expressed in Pa.s) as a function of time (expressed in s) for an elongation gradient (expressed in $s^{-1}$) of 0.1.

Example 1R (comparison example)

The extruder is fed with 3000 g of a propylene homopolymer marketed under the name Eltex® P HL 001 P by the company Solvay.

The RER diagram illustrated by curve 1 in FIG. 1 shows the absence of structural stress hardening: the elongational viscosity decreases until ductile rupture of the sample.

Example 2 (according to the invention)

The extruder is fed with a mixture containing:
3000 g of Eltex P HL 001 P homopolymer;
36 g of trimethylolpropane triacrylate (TMPTA);
0.75 g of 2,5-dimethyl-2,5-di-tert-butylperoxyhexane (DHBP);
0.75 g of tetraethylthiuram disulphide (TDS).

The RER diagram illustrated by curve 2 in FIG. 1 shows an increase in the elongational viscosity as a function of time. The polymer therefore exhibits structural stress hardening.

Example 3R (comparison example)

Example 2 is repeated, except that the TDS is omitted.

The RER diagram illustrated by FIG. 1 (curve 3) shows the absence of structural stress hardening.

Examples 4 to 7 (according to the invention)

The extruder is fed with mixtures similar to that of Example 2, except that use is made of 0.75 g of TDS in Example 4, 0.60 g of TDS in Example 5, 0.45 g of TDS in Example 6 and 0.30 g of TDS in Example 7.

Figure 2:
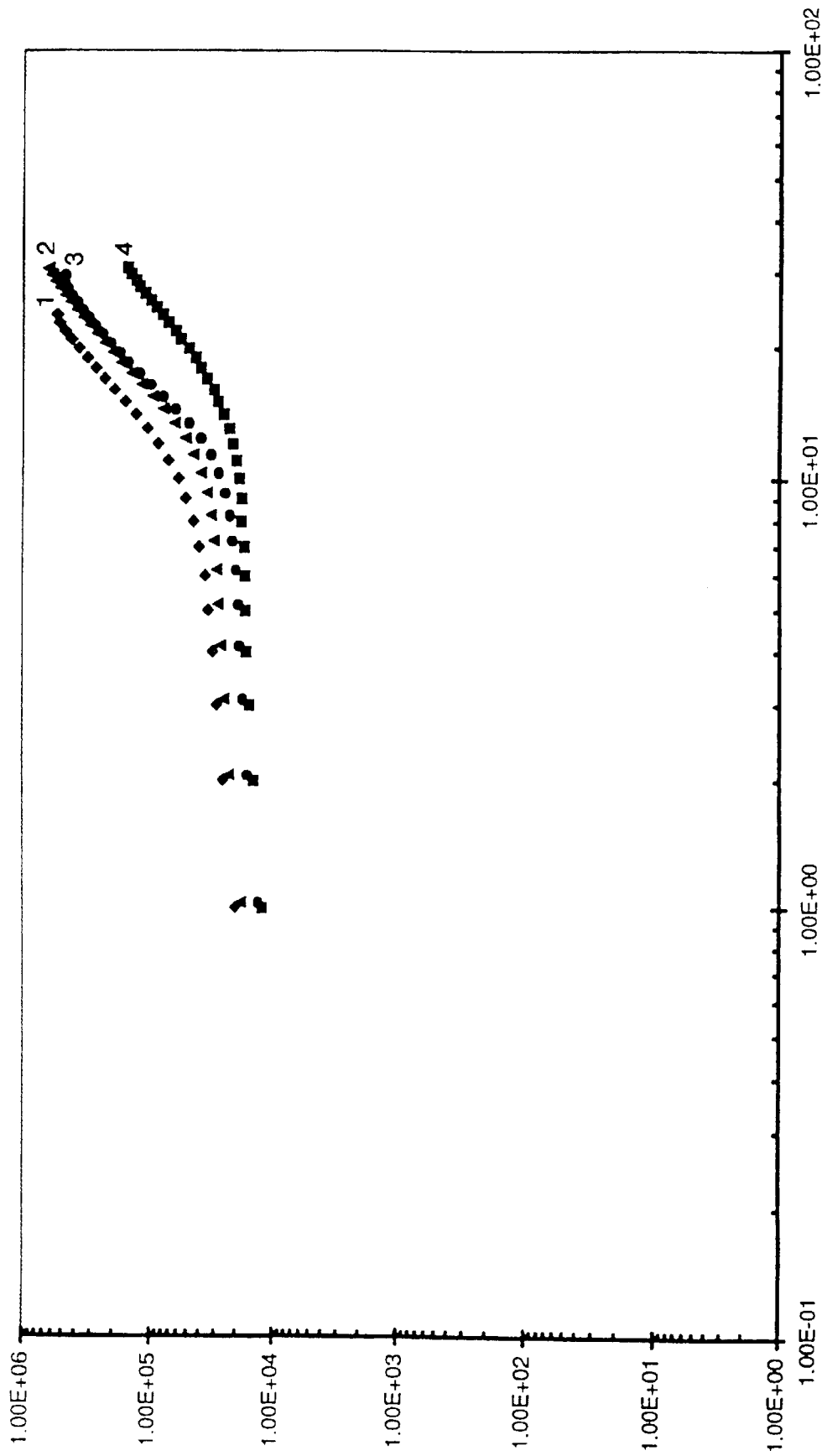

The RER diagrams illustrated by FIG. 2 (curves 1 to 4) show a structural stress hardening phenomenon, the amplitude of which is related to the amount of TDS used.

What is claimed is:

1. A propylene polymer obtained by melt-blending:

100 parts by weight of polypropylene;

from 0.01 to 10 parts by weight of a functional compound (a) comprising at least 2 acrylate groups;

at least 0.005 part by weight of a sulphur-containing compound (b) chosen from thiuram sulphides according to the formula

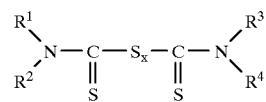

in which x is equal to 2 and $R^1$, $R^2$, $R^3$ and $R^4$, which can be identical or different, represent an alkyl radical containing from 1 to 10 carbon atoms or phenyl radical, and wherein $R^1$ and $R^2$ and $R^3$ and $R^4$ respectively may together form a divalent radical of formula —$(CH_2)_n$— where n is equal to 5 or 6, and from 0.01 to 5 parts by weight of a compound (c) capable of generating free radicals, to form said propylene polymer.

2. The propylene polymer according to claim 1, in which the polypropylene is a propylene block copolymer containing from 30 to 90% by weight of a first block which is a propylene homopolymer and from 70 to 10% by weight of a second block which is a random propylene copolymer containing from 40 to 60 mol % of ethylene.

3. The propylene polymer according to claim 1, in which the functional compound (a) contains from 3 to 5 acrylate groups.

4. The propylene polymer according to claim 1, in which the amount of functional compound (a) is from 0.5 to 2 parts by weight.

5. The propylene polymer according to claim 1, in which the amount of compound (b) is from 0.015 to 0.05 part by weight.

6. The propylene polymer according to claim 1 exhibiting, in the molten state, an increase in the resistance to deformation during elongation or extension.

7. In a method of shaping objects by blow-extrusion or injection blow moulding, thermoforming or coating and for the manufacture of foams, the improvement comprising said objects or foam comprising a polymer according to claim 1.

8. A shaped object containing a propylene polymer according to claim 1.

9. A process for obtaining a propylene polymer, comprising:

a stage of melt-blending
100 parts by weight of a polypropylene; from 0.01 to 10 parts by weight of a functional compound (a) chosen from compounds comprising at least 2 acrylate groups;

at least 0.005 part by weight of a sulphur-containing compound (b) chosen from thiuram sulphides according to the formula

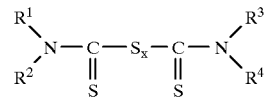

in which x is equal to 2 and $R^1$, $R^2$, $R^3$ and $R^4$, which can be identical or different, represent an alkyl radical containing from 1 to 10 carbon atoms or phenyl radical, and wherein $R^1$ and $R^2$ and $R^3$ and $R^4$ respectively may together form a divalent radical of formula —$(CH_2)_n$— where n is equal to 5 or 6,; and from 0.01 to 5 parts by weight of a compound (c) capable of generating free radicals, and recovering said propylene polymer.

10. A propylene polymer obtained by melt-blending:

100 parts by weight of a polymer selected from the group consisting of the homopolymers and copolymers of propylene containing at least 50 mol % propylene, and mixtures thereof, from 0.01 to 10 parts by weight of a functional compound (a) comprising at least 2 acrylate groups, at least 0.005 part by weight of a sulphur-containing compound (b) selected from thiuram sulphides, according to the formula

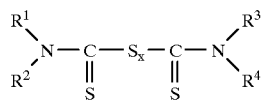

in which x is equal to 2 and $R^1$, $R^2$, $R^3$ and $R^4$, which can be identical or different, represent an alkyl radical containing from 1 to 10 carbon atoms or phenyl radical, and wherein $R^1$ and $R^2$ and $R^3$ and $R^4$ respectively may together form a divalent radical of formula —$(CH_2)_n$— where n is equal to 5 or 6, and from 0.01 to 5 parts by weight of a compound (c) capable of generating free radicals, to form said propylene polymer.

11. In a method of shaping objects by blow-extrusion or injection blow moulding, thermoforming or coating, and for the manufacture of foams, the improvement comprising said objects or form comprising a polymer according to claim 10.

12. A shaped object containing a propylene polymer according to claim 10.

13. A process for obtaining a propylene polymer, comprising:

a stage of melt blending 100 parts by weight of a polypropylene;

from 0.01 to 10 parts by weight of a functional compound (a) chosen from compounds comprising at least 2 acrylate groups;

at least 0.005 part by weight of a sulphur-containing compound (b) chosen from thiuram sulphides according to the formula

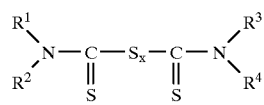

in which x is equal to 2 and $R^1$, $R^2$, $R^3$ and $R^4$, which can be identical or different, represent an alkyl radical containing from 1 to 10 carbon atoms or phenyl radical, and wherein $R^1$ and $R^2$ and $R^3$ and $R^4$ respectively may together form a divalent radical of formula —$(CH_2)_n$— where n is equal to 5 or 6,; and from 0.01 to 5 parts by weight of a compound (c) capable of generating free radicals, and recovering said propylene polymer.

\* \* \* \* \*